Nov. 20, 1962 W. H. DU BOIS 3,064,782
LINING BUTTON-SPRING LOADED
Filed Dec. 15, 1958
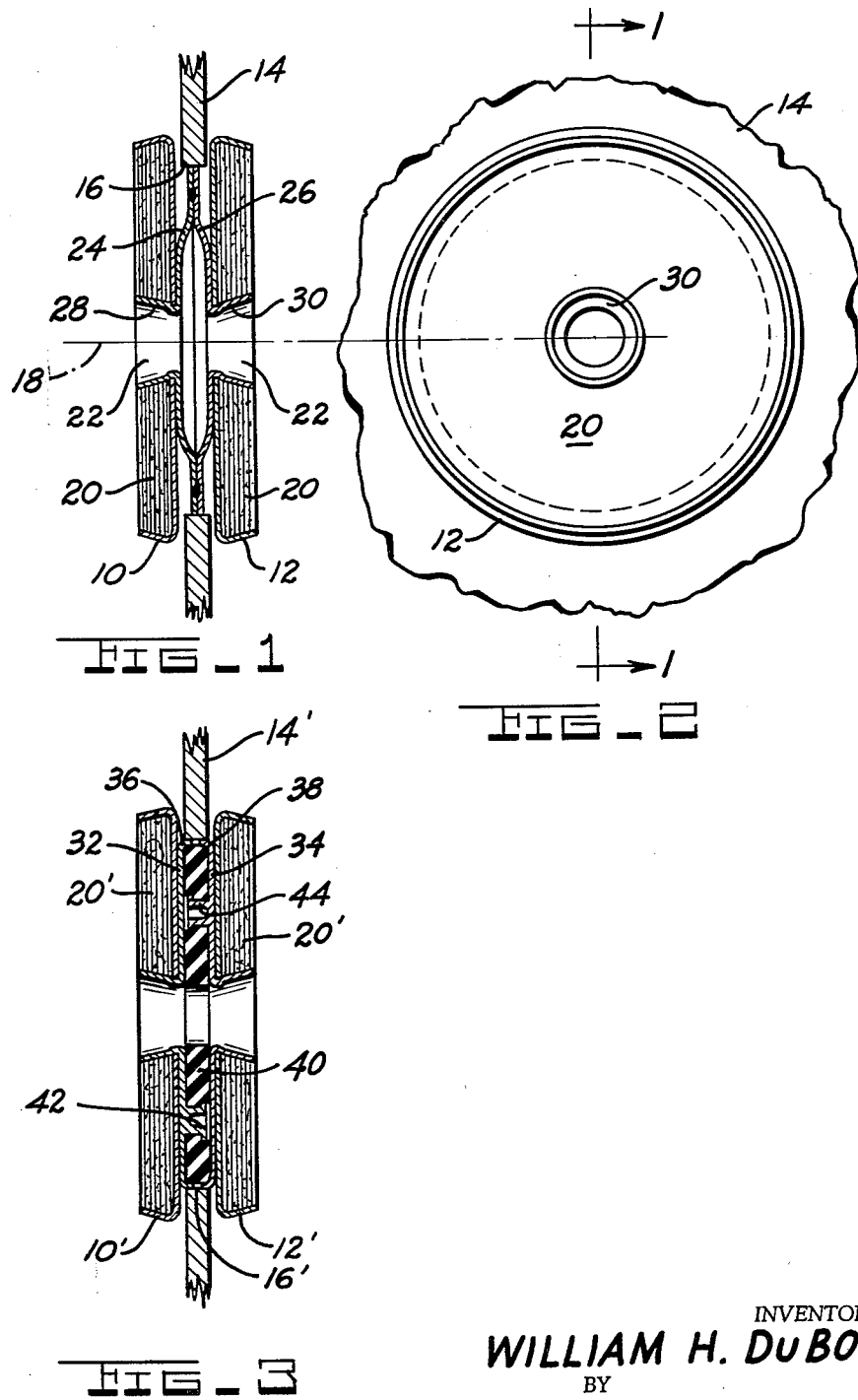
INVENTOR.
WILLIAM H. DuBOIS.
BY
William P. Hickey
ATTORNEY.

United States Patent Office 3,064,782
Patented Nov. 20, 1962

3,064,782
LINING BUTTON-SPRING LOADED
William H. Du Bois, South Bend, Ind., assignor to The Bendix Corporation, a corporation of Delaware
Filed Dec. 15, 1958, Ser. No. 780,328
7 Claims. (Cl. 192—107)

The present invention relates to means for securing friction producing structures to a member which is sandwiched between other relatively moving surfaces; and more particularly to new and improved friction button construction for disc brakes and clutches.

An object of the present invention is the provision of a new and improved structure for resiliently attaching a pair of oppositely facing friction producing elements to a backing plate in a manner which firmly resists shearing forces between the friction elements and backing plate and which resiliently absorbs compressive force of the friction element against the plate member.

Another object of the invention is the provision of a new and improved friction button structure for disc type brakes and clutches wherein a pair of cup-shaped members are positioned back to back on opposite sides of a backing plate over an opening extending through the backing plate, and a pair of disc members are positioned back to back in said opening with their outer periphery engaging the sidewalls of said opening and having oppositely extending tubular flanges which project outwardly into respective openings through the friction elements and are wedged against their sidewalls.

The invention resides in certain constructions, combinations, and arrangements of parts; and further objects and advantages will become apparent to those skilled in the art to which the invention relates from the following description of the preferred embodiments described with reference to the accompanying drawing forming a part of this specification, and in which:

FIGURE 1 is a cross-sectional view through a portion of a backing plate of a disc brake to which a pair of friction elements are attached by structure embodying principles of the present invention;

FIGURE 2 is a plan view of the structures seen in FIGURES 1 and 3;

FIGURE 3 is a cross-sectional view similar to FIGURE 1 showing a second embodiment of the invention.

The structure shown in FIGURE 1 comprises a pair of metallic generally cup-shaped members 10 and 12 that are positioned back to back on opposite sides of a backing plate or stator member 14 of an aircraft disc brake. The stator member 14 is provided with an opening 16 therethrough that is slightly smaller in diameter than the cup-shaped members 10 and 12 and on whose centerline 18 the cup-shaped members are centered. Before assembly to the stator member 14, the cup-shaped members 10 and 12 are filled with a powdered metal 20 containing a ceramic material to increase its effectiveness, which is thereafter sintered in place. The cup-shaped members 10 and 12 are identical in construction and are provided with a centrally located generally cylindrical opening 22 through the sintered powdered metal material 20 and its cup-shaped backing member. The structure is completed by a pair of identical disc members 24 and 26 positioned in the opening 16 with their periphery in engagement with the sidewalls of the opening 16, and having a pair of oppositely facing axially outwardly extending tubular flanges or projections 28 and 30, respectively, which project into the respective openings 22. The disc members 24 and 26 are considerably thinner than the thickness of the backing plate 14 and are bent inwardly into engagement with each other adjacent their outer peripheral edge to provide a spring action which normally maintains the members 10 and 12 out of engagement with the stator 14, but which will permit the members 10 and 12 to be biased into engagement with opposite sides of the stator. The disc members 24 and 26 are spot welded together adjacent their periphery before they are placed in the opening 16. The cup-shaped members 10 and 12 are thereafter slipped over the tubular projections 28 and 30 and are thereafter locked in place by conically swedging the tubular projections 28 and 30 into the sintered powdered metal 20, as well as against the central openings in the cup-shaped members themselves. The sintered powdered metal is somewhat porous and can be compressed somewhat without bulging or breaking. When the stator member 14 is assembled in a brake between a pair of rotor members, and the members are sandwiched together, the initial abutting movement of the members will be yieldingly absorbed by the spring action of the disc members 24 and 26. Engagement of the moving rotor members produces friction on the outer face of the members 10 and 12, and the shearing action so produced is transmitted from the cup members to the disc members 24 and 26, and thence through their periphery to the sidewalls of the opening 16 in the stator member 14.

The embodiment shown in FIGURE 3 is generally similar to that shown in FIGURE 1 differing principally in the manner in which the friction elements are biased apart. Those elements in FIGURE 3 which correspond to elements in FIGURE 1 are designated by a like reference numeral but are characterized further in that a prime mark in affixed thereto. The disc members 32 and 34 shown in FIGURE 3 lie flat against the back of the cup-shaped members 10' and 12', respectively, and have their outer peripheral edge bend inwardly slightly to provide flanges 36 and 38 whose radially outer peripheries engage the sidewalls of opening 16' and the stator 14'. Slightly less clearance is provided between flanges 36 and 38 than is provided between the cup-shaped members and stator member so that they will engage each other when forced together before the cup members 10' and 12' engage the stator member 14'. The cup-shaped members 10' and 12' are urged apart by an annular rubber washer 40 positioned between the disc members 32 and 34; and the members 10' and 12' are loosely retained against separation by snap fasteners 42 and 44 which do not interfere with the engagement of flanges 36 and 38. The structure shown in FIGURE 3 is assembled in a manner similar to that described for FIGURE 1, and operates in substantially the same manner as does the structure of FIGURE 1, and so need not further be described.

While the invention has been described in considerable detail, I do not wish to be limited to the particular constructions shown and described, and it is my intention to cover hereby all novel adaptations, modifications, and arrangements thereof which come within the practice of those skilled in the art to which the invention relates.

I claim:

1. In a friction producing device and the like wherein a first member is adapted to be sandwiched between a pair of members which pair may be moved at a different speed from that of said first member, said first member having an opening therethrough: a pair of friction members generally centered on said opening and spaced back to back on opposite sides of said first member, and means for spacing said friction members from said first member with a generally predetermined clearance, said means comprising a pair of generally disk shaped members positioned back to back between said friction members with their radially outer peripheries in engagement with the sidewalls of said opening in said first member, each of said disk shaped members being attached to the adjacent friction member adjacent the center of said friction member, each of said disk shaped members being spaced apart in the region of their attachment to said friction members so as to provide a predetermined clearance between each of said friction members and said first member, and said disk shaped members having means whereby they are yieldably urged apart in the region of their attachment to said friction members to normally maintain clearance between said friction members and said first member.

2. In a friction producing device and the like wherein a first member is adapted to be sandwiched between a pair of members which pair may be moved at a different speed from that of said first member, said first member having an opening therethrough: a pair of friction members spaced back to back on opposite sides of said first member, and means for spacing said friction members from said first member with a generally predetermined clearance, said means comprising a pair of generally disk shaped members positioned back to back between said friction members with their radially outer peripheries in engagement with the sidewalls of said opening in said first member, said disk shaped members being fixed to the centers of respective ones of said friction members, said disk members having clearance between themselves adjacent their point of attachments to said friction members and being bent together at other points to bias each other apart and normally maintain said predetermined clearance between said friction members and said first member.

3. In a friction producing device and the like wherein a first member is adapted to be sandwiched between a pair of members which pair may be moved at a different speed from that of said first member, said first member having an opening therethrough: a pair of friction members spaced back to back on opposite sides of said first member, and means for spacing said friction members from said first member with a generally predetermined clearance, said means comprising a pair of generally disk shaped members positioned back to back between said friction members with their radially outer peripheries in engagement with the sidewalls of said opening in said first member, said disk shaped members fixed to the centers of respective ones of said friction members, and a resilient member positioned between said disk member to bias each other apart and normally maintain said predetermined clearance between said friction members and said first member.

4. In a friction producing device and the like wherein a first member is adapted to be sandwiched between a pair of members which pair may be moved at a different speed from that of said first member, said first member having an opening therethrough: a pair of cup-shaped shaped members spaced back to back on opposite sides of said first member, each of said cup-shaped members having an opening that is generally centered with respect to said opening in said first member and said cup-shaped members being filled with a deformable material having an outwardly diverging conical opening therethrough aligned with the opening in its receiving cup-shaped member, and means for spacing said cup-shaped members from said first member with a generally predetermined clearance, said means comprising a pair of generally disk shaped members positioned back to back between said cup-shaped members with their radially outer peripheries in engagement with the sidewalls of said opening in said first member, said disk shaped members having axially outwardly extending tubular projections in expanded resilient engagement with the sidewalls of said conical openings in the deformable material in respective ones of said cup-shaped members, and disk shaped members having means whereby they are yieldably urged apart in the region of their attachment to said annular members to normally maintain said predetermined clearance between said cup-shaped members and said first member.

5. In a friction producing device and the like wherein a first member is adapted to be sandwiched between a pair of members which pair may be moved at a different speed from that of said first member, said first member having an opening therethrough: a pair of cup-shaped members spaced back to back on opposite sides of said first member, each of said cup-shaped members having an opening that is generally centered with respect to said opening in said first member and said cup-shaped member being filled with a deformable material having an outwardly diverging conical opening therethrough aligned with the opening in its receiving cup-shaped member, and means for spacing said cup-shaped members from said first member with a generally predetermined clearance, said means comprising a pair of generally disk shaped members positioned back to back between said cup-shaped members with their radially outer peripheries in engagement with the sidewalls of said opening in said first member, said disk shaped members having axially outwardly extending tubular projections in expanded resilient engagement with the sidewalls of said conical openings in the deformable material in respective ones of said cup-shaped members, said disk members having clearance between themselves adjacent their point of attachments to said cup-shaped members and being bent together at other points to bias each other apart and normally maintain said predetermined clearance between said cup-shaped members and said first member.

6. In a friction producing device and the like wherein a first member is adapted to be sandwiched between a pair of members which pair may be moved at a different speed from that of said first member, said first member having an opening therethrough: a pair of annular members spaced back to back on opposite sides of said first member, each of said annular members being made of a deformable material which has an outwardly diverging opening therein that is generally centered with respect to the sidewalls of said opening in said first member, and means for spacing said annular members from said first member with a predetermined clearance, said means comprising a pair of generally disk shaped members positioned between said annular members with their backs facing each other and with their radially outer peripheries in engagement with the sidewalls of said opening in said first member, said disk shaped members having axially outwardly extending tubular projections in expanded resilient engagement with the sidewalls of said conical openings in respective ones of said annular members, said disk members having clearance between themselves adjacent their point of attachments to said annular members and being bent together at other points to bias each other apart and normally maintain said predetermined clearance between said annular members and said first member.

7. In a friction producing device and the like wherein a first member is adapted to be sandwiched between a pair of members which pair may be moved at a different speed from that of said first member, said first member having an opening therethrough: a pair of annular members spaced back to back on opposite sides of said first member, each of said annular members being made of a resilient material which has an outwardly diverging conical opening therein that is generally centered with respect to said opening in said first member, and means for spacing said annular members from said first member with a predetermined clearance, said means comprising a pair of generally disk shaped members positioned between said annular members with their backs facing each other and with their radially outer peripheries in engagement with the sidewalls of said opening in said first member, said dish shaped members having axially outwardly extending tubular projections in expanded resilient engagement with the sidewalls of said conical openings in respective ones of said annular members, and a resilient member positioned between said disk members to bias each other apart and normally maintain said predetermined clearance between said annular members and said first member.

References Cited in the file of this patent

UNITED STATES PATENTS

| | | |
|---|---|---|
| 2,016,305 | Wales | Oct. 8, 1935 |
| 2,270,477 | Ruesenberg | Jan. 20, 1942 |
| 2,448,880 | Gamble | Sept. 7, 1948 |
| 2,835,367 | Steck | May 20, 1958 |
| 2,916,123 | Garmager | Dec. 8, 1959 |

FOREIGN PATENTS

| | | |
|---|---|---|
| 269,696 | Great Britain | Apr. 28, 1927 |
| 499,589 | Great Britain | Jan. 19, 1939 |
| 130,776 | Australia | Jan. 5, 1949 |

UNITED STATES PATENT OFFICE
CERTIFICATE OF CORRECTION

Patent No. 3,064,782 November 20, 1962

William H. Du Bois

It is hereby certified that error appears in the above numbered patent requiring correction and that the said Letters Patent should read as corrected below.

Column 4, line 39, before "opening" insert -- conical --; line 73, for "dish" read -- disk --.

Signed and sealed this 27th day of August 1963.

(SEAL)
Attest:

ERNEST W. SWIDER
Attesting Officer

DAVID L. LADD
Commissioner of Patents